United States Patent [19]
Sata et al.

[11] 4,029,754
[45] June 14, 1977

[54] PROCESS FOR PRODUCING HYDROGEN AND OXYGEN

[75] Inventors: Shoichi Sata, Mito; Yasumasa Ikezoe, Tokai, both of Japan

[73] Assignee: Japan Atomic Energy Research Institute, Tokyo, Japan

[22] Filed: July 11, 1975

[21] Appl. No.: 595,324

[30] Foreign Application Priority Data

July 18, 1974 Japan .............................. 49-82547

[52] U.S. Cl. .......................... 423/579; 423/415 A;
423/500; 423/605; 423/655; 423/656
[51] Int. Cl.² ..................... C01B 13/02; C01B 1/02
[58] Field of Search ...... 423/481, 486, 491, 415 A,
423/500, 579, 605, 655, 656

[56] References Cited
UNITED STATES PATENTS

| | | | |
|---|---|---|---|
| 1,420,209 | 6/1922 | Paulus | 423/415 A |
| 2,204,888 | 6/1940 | Dougherty | 423/605 X |
| 2,538,235 | 1/1951 | Coffey | 423/655 |
| 3,755,556 | 8/1973 | Aldridge | 423/655 |
| 3,850,840 | 11/1974 | Aldridge et al. | 423/655 X |
| 3,850,841 | 11/1974 | Aldridge et al. | 423/655 X |

*Primary Examiner*—Jack Cooper
*Attorney, Agent, or Firm*—Browdy and Neimark

[57] ABSTRACT

A closed cycle process produces hydrogen and oxygen from water by use of manganese chloride and carbon dioxide. The four reactions of the cycle are:

1. $MnCl_2 + CO_2 \longrightarrow MnO + CO + Cl_2$
2. $CO + H_2O \longrightarrow CO_2 + H_2$
3. $MnO + 2\ HCl \longrightarrow MnCl_2 + H_2O$
4. $Cl_2 + H_2O \longrightarrow 2HCl + \frac{1}{2} O_2$.

4 Claims, No Drawings

PROCESS FOR PRODUCING HYDROGEN AND OXYGEN

BACKGROUND OF THE INVENTION

1. Field of the Invention

The present invention relates to a process for producing hydrogen.

2. Description of Prior Art

The prior art method for producing hydrogen on an industrial scale is to pass $H_2O$ vapor through heated fossil fuels such as coal or petroleum which mainly consist of hydrocarbon and sometimes by taking advantage of the combustion heat of the fossil fuels.

Electrolysis of water is also employed to produce hydrogen but this, too, depends on fossil fuels which are on the verge of exhaustion in the sense that it requires electric energy which is generated by burning the same fuels. In addition to that, since the conventional art of producing hydrogen is accompanied by discharge of carbon dioxide and sulfur dioxide acid gas, there is a great anxiety about the aggravation of environmental pollution by industrial wastes which have already increased to an unbearable extent in proportion to the industrial development.

A process for producing hydrogen by using water, calcium bromide and mercury compounds at a temperature not higher than 1000° C in a nuclear reactor was patented in France in 1970 (French Pat. No. 2,035,558). But two serious defects make this process infeasible for largescale production. For one thing, even if caution is exercised not to discharge the mercury compounds which are very poisonous by themselves, people living in the neighborhood of plants as well as engineers working there are soon exposed to a great hazard by accidental discharge or by leakage from the plant. For another, the choice of materials to make reaction vessels is very limited on account of the high temperature (as high as 700° to 800° C) adopted in the reaction of a conjugate system comprising water and halides.

Therefore, there has been a great need in the art concerned to develop a novel technology which not only obviates the use of the fossil fuels that will dry up in the long run but which also is clean in the sense that nobody has to worry about environmental disruption it may cause or any poisons it may discharge.

As a result of our devoted efforts, the present inventors have found a novel process for producing hydrogen and oxygen in which only water is continuously fed into the reaction system and heat having a temperature of not higher than 1000° C is utilized. There are three advantages which are worth special mention in this process: first, in the process of this invention, fossil fuels whose scarcity and tendency to be more costly than ever before is worldwide are neither used as the source of heat nor as the starting material that is continuously fed into the reaction system; secondly, it does not need to use any intermediate reaction products which are extremely poisonous; and thirdly, no wastes that may be ecologically undesirable will be discharged from the reaction system of this process.

SUMMARY OF THE INVENTION

The main object of this invention is to provide a novel process for producing hydrogen.

Another object of this invention is to provide a closed cycle process for producing hydrogen by use of manganese chloride and carbon dioxide.

Still another object of this invention is to provide a novel process for producing hydrogen and oxygen in which only water is continuously fed into the reaction system and heat having a temperature of not higher than 1000° C is utilized.

A still further object of this invention is to provide a process for separating water into hydrogen and oxygen comprising the step of reacting manganese (II) chloride with carbon dioxide to obtain manganese (II) oxide, carbon monoxide and chlorine, the step of reacting carbon monoxide with water vapor to recover carbon dioxide and obtain hydrogen, the step of reacting manganese (II) oxide with hydrogen chloride to recover manganese (II) chloride, and the step of reacting chlorine and water vapor to obtain hydrogen chloride and oxygen.

These and other objects as well as advantages of this invention will become apparent from the following detailed description.

DETAILED DESCRIPTION OF THE INVENTION

This invention relates to a closed cycle process for producing hydrogen by use of manganese chloride and carbon dioxide. More particularly, it relates to a process for producing hydrogen and oxygen by using manganese chloride and carbon dioxide as intermediate reaction materials which are repeatedly used in the reaction system and water as the only material that is continuously fed into the reaction system within a range of temperature which permits a nuclear reactor to be utilized as the source of heat.

In the following pages, the reaction mechanism of the process of this invention is described in detail.

Water is used as the only material that is continuously fed into the reaction system and it is decomposed into hydrogen and oxygen in the main reaction system which consists of four reactions, and the intermediate reaction materials are repeatedly used.

The four reactions mentioned above take the following courses, respectively:

Reaction (1): $MnCl_2 + CO_2 = MnO + CO + Cl_2$.
Reaction (2): $CO + H_2O = CO_2 + H_2$
Reaction (3): $MnO + 2HCl = MnCl_2 + H_2O$
Reaction (4): $Cl_2 + H_2O = 2HCl + \frac{1}{2} O_2$.

Since Reaction (1) yields higher manganese oxide other than manganese (II) oxides as by-products, the following reactions are carried out to use them repeatedly in the reaction system:

Reaction (1A): $Mn_3O_4 + 4HCl = 2MnCl_2 + MnO_2 + 2H_2O$
Reaction (1B$_1$): $3MnO_2 = Mn_3O_4 + O_2$ and
Reaction (1B$_2$): $2MnO_2 = Mn_2O_3 + \frac{1}{2} O_2$
Reaction (1C): $Mn_2O_3 + Cl_2 + H_2O = 2MnO_2 + 2HCl$
Reaction (1D): $Mn_2O_3 + 2HCl = MnO_2 + MnCl_2 + H_2O$.

As a modification of this process, oxygen in air may be taken into the reaction system by way of the course mentioned below if it is desired to increase the measured amount of oxygen over that of hydrogen:

Reaction (1E): $MnO + O_2 =$ higher manganese oxides such as $Mn_2O_3$, $Mn_3O_4$, etc.

In Reaction (1), manganese (II) oxide, carbon monoxide and chlorine are formed by contacting manganese (II) chloride with carbon dioxide at a temperature not lower than 550° C where almost no phosgene is produced from carbon monoxide and chlorine. In Reaction (2), the CO conversion reaction is effected between CO and $H_2O$ vapor to obtain hydrogen and to recover carbon dioxide. In Reaction (3), a solid product formed in Reaction (1) which mainly consists of manganese (II) oxide is reacted with the hydrogen chloride obtained in Reaction (4) to recover manganese (II) chloride. Finally, in reaction (4), chlorine obtained in Reaction (1) reacts with water to recover hydrogen chloride and obtain oxygen.

In accordance with the embodiment of this invention, it is necessary to maintain the temperature for Reaction (1) to be not lower than 550° C where the reaction is allowed to proceed smoothly and almost no phosgene is produced from carbon monoxide and chlorine. On the other hand, if the temperature is higher than 650° C where manganese (II) chloride melts, manganese oxide is formed in the melt of manganese (II) chloride. At even higher temperatures, part of manganese (II) chloride sublimes and reacts with carbon dioxide in gas phase. Reaction (1) proceeds even in the solid phase having a temperature not higher than the melting point of manganese (II) chloride. Part of the manganese (II) oxide obtained in Reaction (1) reacts with carbon dioxide to form higher manganese oxide such as manganese (III) oxide ($Mn_2O_3$), manganese (II, III) oxide ($Mn_3O_4$) etc. and said higher oxide is returned to the main reaction system by way of the additional reactions (1A), (1B), (1C) and (1D) which will be detailed below.

In Reaction (1A), manganese (II, III) oxide is suspended in a solution of hydrogen chloride to obtain aqueous solution of manganese (II) chloride and a precipitate of manganese (IV) oxide. The former is returned to Reaction (1) whereas the latter is subjected to Reactions ($1B_1$) and ($1B_2$) where it is heated to 300° to 900° C to release oxygen and form manganese (III) oxide or manganese (II, III) oxide, the latter of which is returned to Reaction (1A) while the former of which is subjected to Reaction (1C) in the aqueous suspension where it is reacted with chlorine obtained from Reaction (1) to form manganese (IV) oxide and hydrogen chloride; the two reaction products are either turned back to Reactions (1B) and Reaction (3), respectively, or the latter is subjected to Reaction (1D) along with manganese (III) oxide where they react with each other in dry state to form manganese (IV) oxide and manganese (II) chloride, which are further returned to Reactions (1B) and (1), respectively. By being subjected to these additional Reactions (1A), (1B), (1C) and (1D), the by-product of Reaction (1), i.e. higher manganese oxides other than manganese (II) oxide are completely recycled.

As a further modification of the process of this invention, manganese (II) oxide obtained in Reaction (1) and which is easily oxidized is subjected to Reaction (1E) where it is brought into contact with air to form higher manganese oxide such as manganese (III) oxide, and thereafter returned to additional reactions such as Reactions (1C) and (1D): this modified process results in an increase of the amount of oxygen produced from a unit amount of water fed to the entire reaction system.

Since no hydrogen compounds are included in the system of Reaction (1) and as a result, no water is present therein, the problem of corrosion of reaction vessels which often vexes those engineers who handle chlorides at high temperatures is not so serious as it used to be, and therefore, the choice of materials to make the vessels has become very easy to make. In this respect, the process of the present invention has a particular advantage over the above mentioned French Patent where calcium bromide has to be subjected to hydrolysis at high temperatures.

In Reaction (2), conventionally known as the CO conversion reaction, most of a mixture of CO and $H_2O$ vapor completes the reaction in contact with a Fe-Cr catalyst at a temperature within the range of from 350° to 500° C in the first place, and then all the mixture is contacted with a Cu-Zn catalyst at a temperature of from 200° to 250° C to complete the reaction.

Reaction (3) is also a conventional one where manganese (II) chloride is produced by reacting manganese (II) oxide with a solution or gas of hydrogen chloride preferably in the absence of oxygen. If oxygen is contained in the gas and manganese (II) oxide is oxidized to form higher oxides, they must be returned to the main reaction system through the additional reactions mentioned above.

Reaction (4) is a reverse reaction of a reaction for producing chlorine and water from hydrogen chloride and oxygen known by the name of the Deacon Reaction, and it proceeds at a temperature of 600° C or higher.

By means of such main reaction system which comprises four reactions, hydrogen and oxygen can be obtained by feeding only water continuously at a temperature of not higher than 1000° C. The substances such as manganese (II) chloride which are utilized as intermediate reaction materials are thoroughly recycled by way of the additional reactions so that no waste materials are generated from the reaction system. Although all the reactions but Reaction (1) are conventional, their combination brings about an effect which could never be expected from using them independently or combining them partially.

In the pages that follow, we explain the present invention in more detail by a working example.

EXAMPLE

Reaction (1): A sample of anhydrous manganese (II) chloride weighing 3.15 g was placed in a quartz boat within a quartz tube disposed horizontally in an electric furnace heated at 800° C. Carbon dioxide was passed by way of one end of the tube at a flow rate of 2.6 ml/min (the volumes of gas described in this working example are the ones at 25° C and at an atmospheric pressure) to be reacted with manganese (II) chloride for 6 hours. The gas flowing out of the other end of the tube was charged into the column of a gas chromatography filled with molecular sieve 5A; the CO concentration was determined to be 1.4%. The same gas was analyzed in the column of Chromosorb (sold by Japan Chromato Co., Ltd.) carrying Fluorolube; the concentration of chlorine was found to be 1.1%. The difference between the two values was due to the adsorption of chlorine on the inner wall of the reaction tube.

By passing the gas obtained in this reaction through a trap cooled with liquid nitrogen, all the chlorine and unreacted carbon dioxide was condensed and separated from carbon monoxide, which was immediately subjected to Reaction (2).

After completion of Reaction (1), the contents were scraped out of the quartz tube, dissolved in water from which air had been expelled, and the precipitate was filtered. The partially reacted solid content which deposited through sublimation on the inner wall of the quartz tube was likewise dissolved in the absence of air, and the undissolved portion was filtered. Both filtrates were heated together to evaporate water. Just before they were evaporated to dryness, they were transferred to a desiccator containing calcium chloride. They were further dried in a stream of dry hydrogen chloride at 160° C for 4 hours to recover 3.08 g of anhydrous manganese (II) chloride.

Reaction (2): A mixture of ferric (III) nitrate nona-hydrate and chrominium (III) nitrate nona-hydrate in the ratio of 10:1 was dissolved in water, ammonia water was added to it, the precipitate obtained was filtered, air-dried, and calcined at 650° C to prepare a solid catalyst comprising ferric (III) oxide as a major component and chromic (III) oxide as the remainder. A particulate sample (10 g) of this solid catalyst was charged in the quartz tube, through which a nitrogen stream mixed with the CO stream obtained in Reaction (1) and $H_2O$ vapor was passed. The stream mixture had a CO concentration of 10%, a $H_2O$ vapor concentration of 15%, and its total flow rate was 0.364 ml/min. Such a stream was passed through the catalyst bed maintained at 400° C; when unreacted water was separated by condensation, a gas having a $H_2$ concentration 6.0%, $CO_2$ concentration 5.9% and unreacted CO concentration 5.1% was obtained. This reaction, as a continuation of Reaction (1), continued for 6 hours to recover 7.0 ml of carbon dioxide and obtain 7.1 ml of hydrogen. Of 14.4 mg of water supplied to this reaction, 5.2 mg was consumed.

Reaction (3): The precipitate filtered in Reaction (1), the solid filtered out from the deposit on the inner wall of the quartz tube, and the solid still deposited on the wall, all three being principally made up of manganese (II) oxide, were dissolved in hydrochloric acid to obtain an aqueous solution of manganese (II) chloride. This procedure was carried out in the absence of air. The determination of the manganese (II) chloride recovered was effected in the following manner: the aqueous solution was boiled, and while carbon dioxide was passed through the solution at ordinary temperature, an aqueous solution of an excess ammonium carbonate was added to it to form the precipitate of manganese (II) carbonate, which was filtered, washed, dried, and determined in a desiccator which contained calcium chloride: 60 mg of anhydrous manganese (II) carbonate corresponding to 70 mg of anhydrous manganese (II) chloride was obtained. All manganese (II) chloride was recovered by getting through Reaction (3) as well as Reaction (1). These results indicate that 9.7 mg of water was formed when manganese (II) oxide dissolved in hydrochloric acid.

Reaction (4): All of the gas mixture of chlorine and unreacted carbon dioxide obtained in Reaction (1) was transferred to a quartz reaction vessel of 1.5 lit. capacity which contained 1.8 mg of water and heated at 850° C for 15 hours. Analysis of the gas reacted showed the concentration of hydrogen chloride to be 0.42%, with an $O_2$ concentration of 0.22%, and unreacted $Cl_2$ making up 0.64% concentration. This means that of 18 mg of water supplied to the reaction system, 3.2 mg was consumed to produce 4.0 ml of hydrogen chloride and 2.2 ml of oxygen.

To summarize the yield of the four reactions mentioned above, hydrogen is first formed in Reaction (2) in an amount of 7.1 ml which can be eventually increased to 13.2 ml by the presence of 6.1 ml of unreacted carbon monoxide that can be used again to form an equal amount of hydrogen. Oxygen is formed in Reaction (4) in an amount of 2.2 ml, and the presence of 6.1 ml of unreacted chlorine which is able to form half as much amount of oxygen increases this oxygen value to 5.2 ml. As for water supplied, 5.2 mg is consumed in Reaction (2) and 3.2 mg in Reaction (4). An additional 4.5 mg would be consumed if 6.1 ml of unreacted carbon monoxide of Reaction (2) reacted, and also an additional 2.2 mg if 6.1 ml of unreacted chlorine of Reaction (4) reacted. These combine with 2.1 ml of water which would have been consumed in Reaction (4) with 2.8 ml of chlorine if the latter were not lost through adsorption in Reaction (1), thereby making the total amount of water decomposed 17.2 mg. If 9.7 mg of water which should have been formed in Reaction (3) is subtracted from this value, we get 8.5 mg as the amount of water consumed in the entire reaction system. Accordingly, the yield of product based on the amount of water reacted is 115% for hydrogen and 91% for oxygen.

By the foregoing explanation, the many advantages of this invention over the conventional techniques are made clear.

It is to be understood that variations and modifications of the present invention may be made without departing from the scope of the invention. It is also to be understood that the scope of the invention is not be interpreted as limited to the specific embodiment disclosed herein, but only in accordance with the appended claims when read in light of the forgoing disclosure.

We claim:
1. A process for producing hydrogen and oxygen from water, at temperatures not higher than 1000° C, comprising the steps of:
   1. reacting manganese (II) chloride with carbon dioxide at a temperature higher than 550° C to obtain manganese (II) oxide, carbon monoxide and chlorine;
   2. reacting the carbon monoxide obtained as a result of step (1) with water vapor to produce carbon dioxide and hydrogen;
   3. reacting the manganese (II) oxide obtained as a result of step (1) with hydrogen chloride to produce manganese (II) chloride; and
   4. reacting the chlorine obtained as a result of step (1) with water vapor to produce hydrogen chloride and oxygen.

2. A process in accordance with claim 1, wherein the carbon dioxide obtained as a result of step (2) is recycled for use in step (1), the manganese (II) chloride obtained as a result of step (3) is recycled for use in step (1), and the hydrogen chloride obtained as a result of step (4) is recycled for use in step (3).

3. A process in accordance with claim 1, wherein higher manganese oxides other than manganese (II) oxides are produced as by-products of step (1), and further including the steps of:
   reacting any $Mn_3O_4$ so formed as one of said by-products of step (1) with hydrochloric acid to effect the following reaction (1A) $Mn_3O_4 + 4 HCl \rightarrow 2 MnCl_2 + MnO_2 + 2H_2O$;

separating and returning the $MnCl_2$ produced as a result of reaction (1A) to said step (1) and heating the $MnO_2$ so produced to release oxygen and form $Mn_3O_4$ and $Mn_2O_3$ in accordance with the following reactions;

(1B$_1$) $3MnO_2 \rightarrow Mn_3O_4 + O_2$;

(1B$_2$) $2MnO_2 \rightarrow Mn_2O_3 + 1/2\ O_2$;

reacting any $MnO_2$ formed as one of said by-products of step (1) in accordance with reactions (1B$_1$) and (1B$_2$);
separating and returning the $Mn_3O_4$ produced as a result of reaction (1B$_1$) to reaction (1A);
reacting any $Mn_2O_3$ formed as one of said by-products of step (1) and the $Mn_2O_3$ produced as a result of reaction (1B$_2$) in accordance with the following reactions;

(1C) $Mn_2O_3 + Cl_2 + H_2O \rightarrow 2 MnO_2 + 2 HCl$;

(1D) $Mn_2O_3 + 2 HCl \rightarrow MnO_2 + MnCl_2 + H_2O$;
and separating and returning the $MnO_2$ produced by reaction (1C) and (1D) to reactions (1B$_1$) and (1B$_2$) and separating and returning the $MnCl_2$ produced as a result of reaction (1D) to said step (1).

4. A process in accordance with claim 3 further including the step of (1E) reacting a portion of the manganese (II) oxide produced as a result of step (1) with air to produce $Mn_2O_3$ and $Mn_3O_2$, and wherein the $Mn_2O_3$ and $Mn_3O_4$ so produced are returned to said reactions (1A), (1C) and (1D).

* * * * *